United States Patent [19]

Schrougham et al.

[11] 4,309,797

[45] Jan. 12, 1982

[54] COUPLING DEVICE FOR ANIMAL COLLARS

[76] Inventors: Benton Schrougham, 243 S. 25th St., Beech Grove, Ind. 46107; John W. Lee, 7791 W. 96th St., Zionsville, Ind. 46077

[21] Appl. No.: 77,114

[22] Filed: Sep. 19, 1979

Related U.S. Application Data

[63] Continuation-in-part of Ser. No. 942,459, Sep. 15, 1979, Pat. No. 4,174,553.

[51] Int. Cl.³ ............................................. A44B 11/00
[52] U.S. Cl. ...................................... 24/307; 40/303; 119/106; 24/323
[58] Field of Search ............. 24/74 R, 73 HR, 206 R, 24/265 R, 73 J, 17 A, 21 R; 40/303, 21 C; 119/106

[56] References Cited

U.S. PATENT DOCUMENTS

| | | | |
|---|---|---|---|
| 244,312 | 7/1881 | Riley | 24/206 R |
| 272,036 | 2/1883 | Fassitt | 40/303 |
| 2,097,070 | 10/1937 | Lago | 119/106 X |
| 2,890,534 | 6/1959 | Quayle | 119/106 X |
| 3,585,743 | 6/1971 | Jeffers | 40/21 C |
| 4,174,553 | 11/1979 | Schrougham et al. | 119/106 X |

*Primary Examiner*—Philip C. Kannan
*Attorney, Agent, or Firm*—Francis T. Kremblas, Jr.; Frank H. Foster

[57] ABSTRACT

A coupler for animal collars characterized by a novel combination of a releasable locking member in the form of a strip of metal which conveniently functions as a name plate. This strip is adapted to receive a pair of post members provided on a channel-like base member which in turn receives respective ends of the collar which are held on the posts until the strip member is removed. One of the posts includes a stop means and the other post is a threaded member adapted to receive a complementary threaded member disposed through spaced holes in the locking strip to effectively couple the ends of the collar together. Merely removing the threaded member from the threaded post permits quick removal of the strip from both posts.

2 Claims, 4 Drawing Figures

COUPLING DEVICE FOR ANIMAL COLLARS

This application is a continuation in part of our co-pending application Ser. No. 942,459 filed Sept. 15, 1979 now U.S. Pat. No. 4,174,553 issued on Nov. 20, 1979.

BACKGROUND OF PRESENT INVENTION

Prior art couplers or animal collar fastening devices have been available for strap-like materials or for chains, but not for both types.

Most couplers for strap collars in the past have required the strap material to be permanently fastened to a buckle by stitching or riveting. Such buckles are not suitable for use with chain collars.

The well-known Conway buckle can be used for overlapping and joining the ends of strap material without the necessity of stitching or riveting. However, the Conway buckle is not suitable for coupling the ends of a chain.

Chain collars in past have had their ends coupled by means of ordinary snaps or by S hooks inserted in holes at the opposite ends of a name plate. These link chain coupling means, however are not suitable for coupling strap materials.

The following patents of interest have been reviewed and relate to this art.

| | |
|---|---|
| 272,036 | 2,097,070 |
| 244,312 | 146,770 |
| 115,647 | 3,641,984 |
| 3,585,743 | 1,408,123 |
| 2,890,534 | 2,065,946 |
| 1,262,447 | 2,680,315 |
| 1,803,196 | 2,539,744 |

It is noted that none of these patents disclose all of the elements of the invention herein or suggest in any unobvious manner the combination of those elements of the invention as disclosed herein.

However, as they are understood by the inventors and their attorney, it is their opinion that the more pertinent of these patents appear to be U.S. Pat. Nos. 244,312, 2,097,070 and 272,036.

U.S. Pat. No. 244,312 discloses a fastening device which includes a pair of curved plates which are adapted to be releasably joined together by aligning a pair of projections on one with mating openings on the other. Upon turning the projections they cannot pass through the registered openings and lock the plates together. The ends of the collar are fixed to respective ends of each plate.

U.S. Pat. No. 2,097,070 discloses a rather complex fastener providing a protective locking device. While a channel like body member is disclosed, it is employed in a quite different manner than that taught by Applicants and does not function or cooperate with the other elements in a similar manner as disclosed in the present invention.

U.S. Pat. No. 272,036 is representative of many others which disclose the concept of providing means in which to hold and display owner information on the collar. However, like the above-noted patents it is believed that there is no showing or suggestion of the unique combination as taught by Applicants in the present invention.

None of these patents disclose a coupler which is easily connected to either strap or chain-like material in a simple and easy manner nor one where a strip functions in combination with a threaded post and screw member to releasably lock the collar ends on post members as taught by Applicants. Nor is there a teaching of such a strip which conveniently and economically also functions as a name plate for owner identification purposes or the like.

Since dogs are kept together, it is a well-known problem that the leather collars are readily accessible to be chewed by the other dogs. In view of the cost of typical buckle-type leather collars, replacement is expensive for those owners who choose not to use metal chain collars on their animals. The coupler of the present invention permits one to replace only the leather strap material when necessary since plain strap material is less expensive than a finished collar and is readily adaptable for use with the present invention. None of the cited patents herein disclose such a coupler which can be as easily adapted to both types of collar materials or which functions in the same manner as the present invention as a coupler for collars.

SUMMARY OF THE PRESENT INVENTION

The coupler for animal collars of the present invention comprises an elongated channel-like base member provided with upraised side walls and an upstanding post member disposed near but spaced from each end of the channel. One post member is provided with a stop means preferably in the form of an outwardly facing shoulder near the top thereof. A flange-like extension, notch or some form of protrusion may be easily provided to form a suitable stop means. The other post member comprises a female threaded post provided with a removably mounted threaded member which includes an enlarged head forming a stop means. The ends of a collar of strap material provided with openings, or the links of a chain, may be adapted to easily slide over a respective post member.

A strip of preferably a light metal material is uniquely employed as a releasable locking means and is positioned on the posts which extend through spaced openings provided in the strip. Then the male threaded member, such as a binder screw, is threaded into the female threaded post member through the opening in the strip and the collar to secure the ends of the collar on the posts.

The upper surface of the strip material may conveniently be provided with owner identification information to serve a dual purpose and increase the economy of the coupler device of the present invention.

OBJECTS OF THE PRESENT INVENTION

It is therefore an object of the present invention to provide a coupler for animal collars which may be used equally as well for strap material or chain collars.

It is another object of the present invention to provide a coupler of the type described which permits the user to conveniently and quickly replace worn or damaged collar portions or to switch from strap material to chain material as desired.

It is still another object of the present invention to provide a coupler of the type described which is opened and closed in a relatively easy and convenient manner and yet provides a secure coupling of the collar on the animal.

It is a further object of the present invention to provide a coupler of the type described which is of relatively low cost compared to other popular types and yet is more versatile and economical to the owners of more than one dog or the like.

IN THE DRAWINGS

DETAILED DESCRIPTION OF THE PRESENT INVENTION

Figure 1:
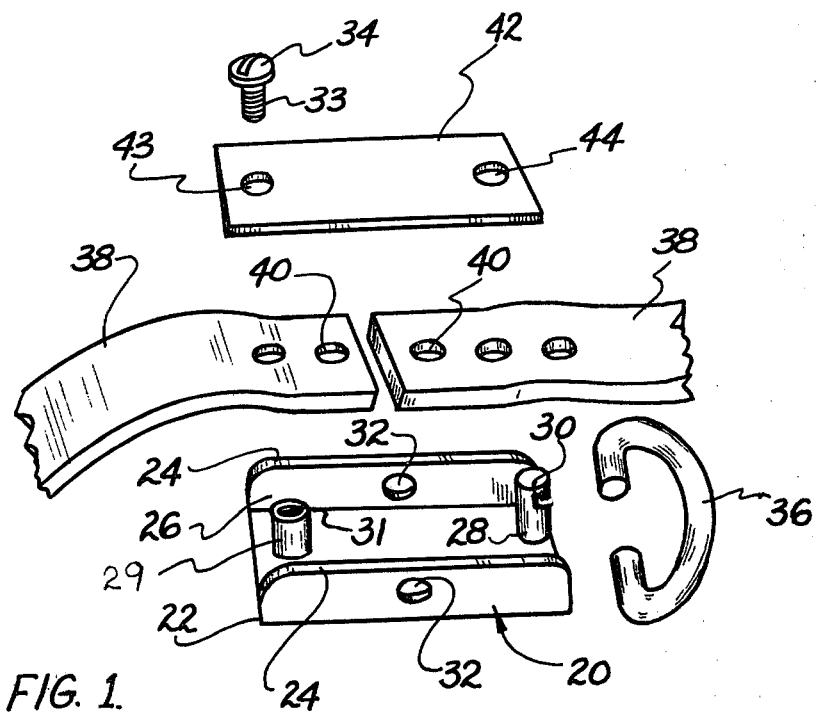
FIG. 1 is a perspective view of a coupler for animal collars constructed in accordance with the present invention with the various portions shown in exploded relationship.
Figure 2:
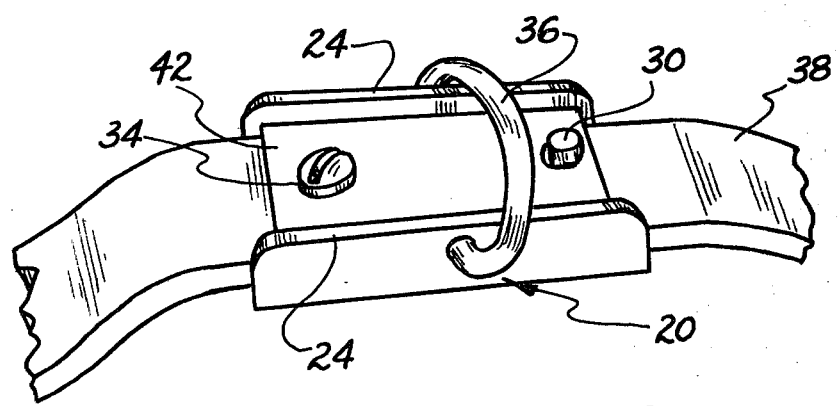
FIG. 2 is a perspective view of the coupler shown in FIG. 1 illustrating the coupler in its normal assembled configuration.

A coupler for animal collars constructed in accordance with the present invention is shown in FIGS. 1 and 2 and includes a base member indicated generally at 20, which comprises a generally rectangular plate 22 having upraised side portions 24 which define the width of a channel 26.

Near one end of plate 22 is a post member 28 which is provided with a stop means preferably in the form of an outwardly facing shoulder such as flange 30 to define the stop position.

Near the opposite end of plate 22 is a second post member 29 including a threaded hole 31 adapted to receive a threaded male member such as a binder screw 33 having an enlarged head 34 forming a shoulder which functions as a removable stop means.

Preferably base member 20 is an integrally formed piece of metal such as from a stamping operation, or one piece of molded plastic in applications where a relatively light construction is deemed feasible.

An aligned pair of holes 32 are provided in side portions 24 to receive a conventional D-ring 36 or the like, for attachment to the snap of a lead or leash.

As seen in FIG. 1, a piece of strap material 38 typically leather or a synthetic substitute, may be provided with one or more openings or holes 40 near but spaced from its respective ends. The length of the collar may be cut according to the size of the animal upon which it is to be used. The additional holes are optional to provide for some degree of adjustment of its length after the initial length has been cut.

One of the respective holes 40 at each end are placed over a respective post member 28 and 29 such that the ends of collar 38 are attached to each end of base member 20.

A releasable locking member is provided in the form of a strip 42 typically of a metallic material, however, a strong plastic material could be employed.

A pair of openings 43 and 44 are provided, one near each end of strip 42. Opening 44 is of a size to fit easily over the flanged post members 28 while opening 43 is adapted to receive post member 29.

The distance between each opening 44 is predetermined to be slightly shorter than the distance between the centerline of the post members such that upon placing opening 44 on post 28, opening 43 will not register over post 29 unless the opening 44 is positioned under the flange 30 so that strip 42 may be moved slightly to the left as seen in FIG. 1.

Upon moving opening 43 in strip 42 to the left as described above, opening 43 may be slipped over post member 29. Now, opening 44 is securely positioned under the flange 30 to prevent upward movement of strip 42 on post 28.

Strip 42 is locked into this position by threaded screw 33 which is extended through opening 43, opening 40 in collar 38 and into threaded hole 31 in post 29. The flange 30 on post 28 functions as a stop means to prevent further travel of strip 42 upwards on post 29 until the threaded screw 33 is removed from post 29 and opening 43 of strip 42 is lifted free of post 29 to permit strip 42 to be moved to the right to allow opening 44 to be lifted clear of the shoulder formed by flange 30. A protrusion or notch or the like could be substituted for flange 30 to form an outwardly facing shoulder without departing from the spirit of the present invention.

Figure 3:
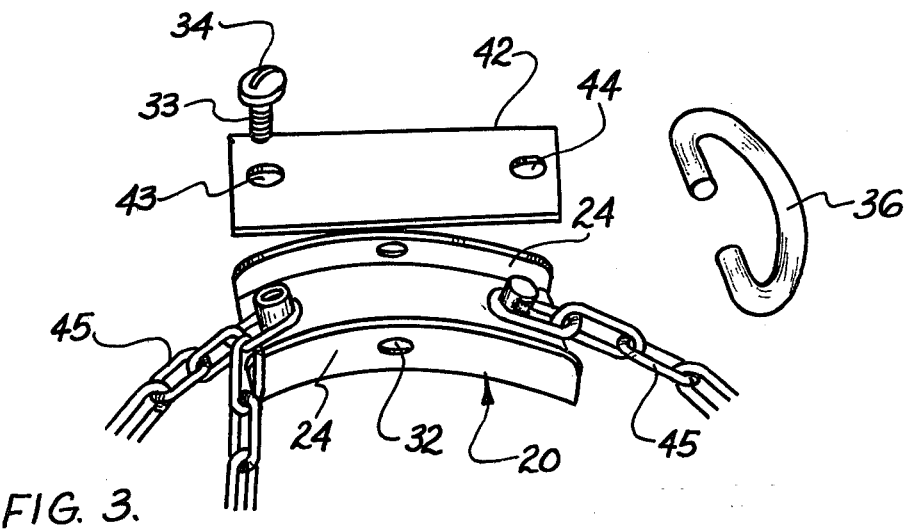
FIG. 3 is a view similar to FIG. 1 illustrating the coupler device with a chain type collar prior to replacement of the locking strip and the threaded locking screw.
Figure 4:
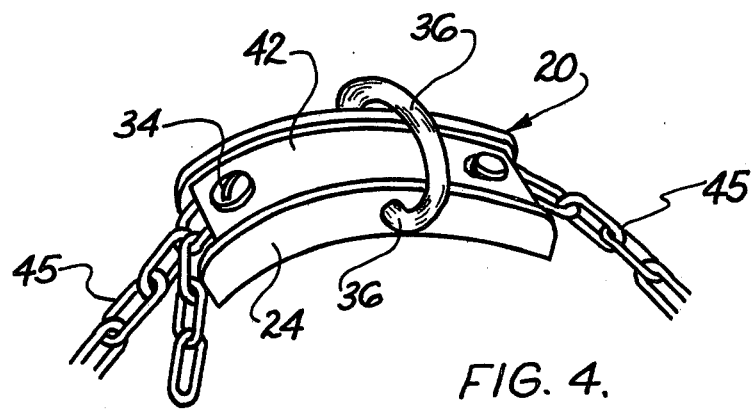
FIG. 4 is a perspective view of the device shown in FIG. 3 with the coupler and chain type collar completely assembled.

As shown in FIG. 3, the coupler of the present invention is equally useful with a chain type collar 46. A link portion of the chain disposed at or near each end may be simply disposed over a respective post member 28 and 29 prior to positioning the strip 42 over the post members as previously described.

It should be noted that owner identification indicia may be conveniently provided by engraving or the like on the upper face of strip 42 so that it may serve as a convenient name tag. This eliminate the need for an additional name plate or the like to be fastened to the collar portion 38 with rivets or the like which the most popular conventional collars require.

Also, it should be pointed out that other forms of collar material may be employed such as a plastic coated piece of metal cable with eyelets disposed at each end. The eyelets would then be positioned over the post member similarly to the links of the chain collar or the holes 40 in a leather collar.

The base member 20, depending upon its size, may be made with a slight degree of curvature to generally conform to the contour of the animals neck, however, the post members should preferably be substantially perpendicular to the upper surface of the base portion 22.

In using the coupler of the present invention, the user merely inserts one of the openings 40, disposed at the respective ends of the collar, or the links at or near the end of chain 42, on a respective post member 28 and 29.

Then opening 44 in strip 42 is positioned over post member 28 with the other opening near the opposite post 29. By positioning the opening under the shoulder formed by flange 30, strip 42 may be moved toward post 29 a distance sufficient to permit the opening 43 to receive the post member 29.

Then threaded member 33 may be positioned through opening 43 and threaded into threaded opening 31 in post 29. The ends of the collar 38 or chain 46 are then securely held in place.

The coupler is unfastened by simply unthreading member 33 and lifting it free from opening 43 which permits strip 42 to be lifted free of post 29 and moved to the right as seen in FIG. 1 which in turn permits opening 44 to be lifted free of flange 30 on post 28.

In view of the foregoing description, it should be readily apparent that the present invention provides a novel, improved coupler for animal collars which is of relatively simple construction, is very easy to use, has greater versatility in the type of collar material which can be used compared to prior couplers of the general type and eliminates the need for rivets or stitching as used on prior collar types.

Further the coupler of the present invention provides a single unit which economically provides the coupling member, the D-ring and a nameplate in a compact construction which the user can employ interchangeably with strap or chain type collars.

What is claimed is:

1. In a coupler device for fastening an animal collar provided with an opening near each end of said collar, the combination of a base member having upstanding, longitudinally extending side portions defining the width of a channel and including a post member disposed near each end of said channel and upraised from the lower surface of said base member, each of said post members including a shoulder forming a stop means and each being adapted to receive a respective one of said openings provided near the respective ends of said collar, one of said shoulders being outwardly facing and provided on one of said post members, the other of said shoulders being provided on a threaded member removably mounted on the other of said post members; a locking member comprising a strip of material including a pair of openings spaced from one another a predetermined distance less than the centerline to centerline distance between said post members, said centerline on at least one of said post members being determined by including the width of said shoulder, a respective one of said openings releasably engaging a respective one of said stop means provided on said post members with said strip forming a closure over said channel and preventing displacement of the ends of said collars from a respective post member, one of said openings in said strip being slideable downwardly over said outwardly facing shoulder to permit said strip to be moved toward said other post member after said opening is disposed on said post member below said shoulder.

2. The device defined in claim 1 wherein said removably mounted threaded member is mounted in a threaded hole provided in one of said post members and includes a flanged head having a width dimension greater than the opening in said strip through which said member is extended.

* * * * *